Aug. 18, 1953  H. D. GOLDBERG ET AL  2,649,573
AREA MEASURING DEVICE
Filed Dec. 21, 1948  4 Sheets-Sheet 1
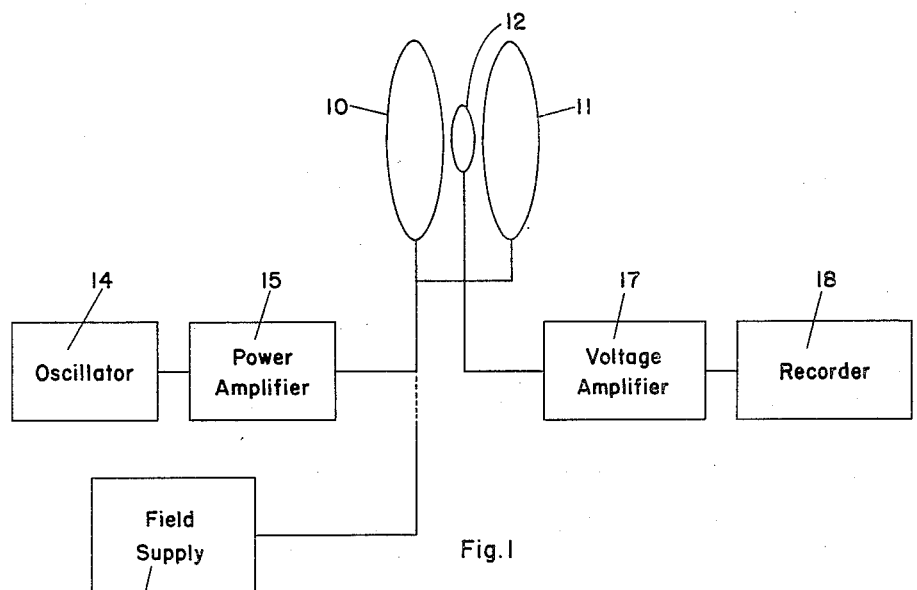
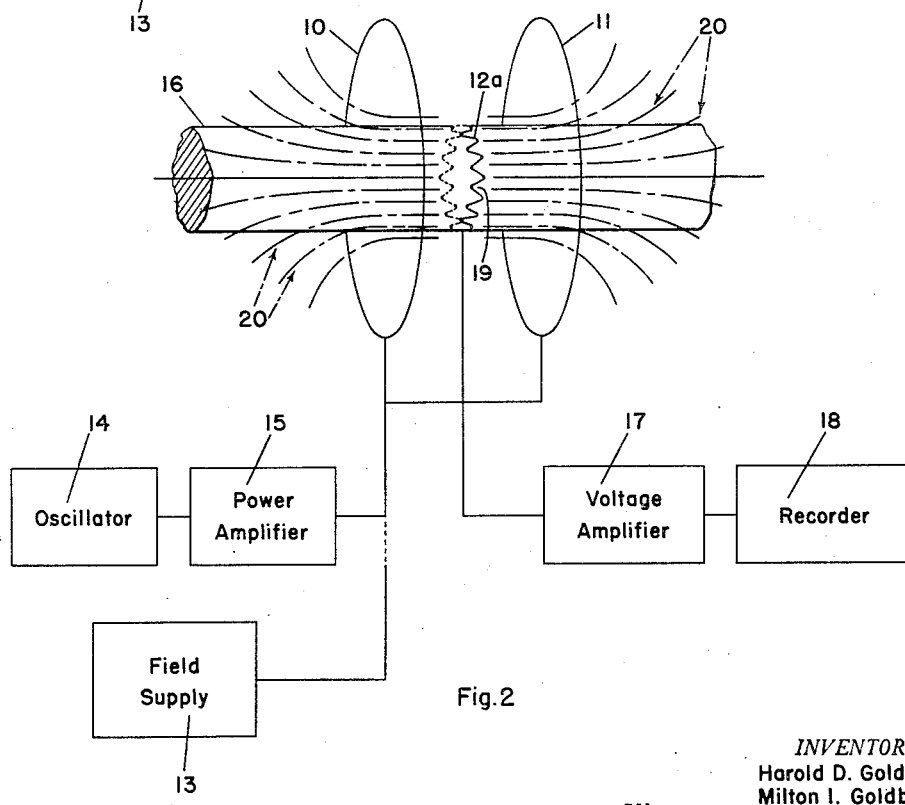
INVENTORS
Harold D. Goldberg
Milton I. Goldberg
BY
ATT'Y.

Aug. 18, 1953  H. D. GOLDBERG ET AL  2,649,573
AREA MEASURING DEVICE

Filed Dec. 21, 1948  4 Sheets-Sheet 2

*INVENTORS*
Harold D. Goldberg
Milton I. Goldberg
BY
*ATT'Y*

INVENTORS
Harold D. Goldberg
Milton I. Goldberg

Aug. 18, 1953    H. D. GOLDBERG ET AL    2,649,573
AREA MEASURING DEVICE
Filed Dec. 21, 1948    4 Sheets-Sheet 4

INVENTORS
Harold D. Goldberg
Milton I. Goldberg
BY
ATT'Y.

Patented Aug. 18, 1953

2,649,573

UNITED STATES PATENT OFFICE 2,649,573

AREA MEASURING DEVICE

Harold D. Goldberg and Milton I. Goldberg,
Bronx, N. Y.

Application December 21, 1948, Serial No. 66,523

18 Claims. (Cl. 324—71)

This invention relates to instruments for measuring areas, volumes and related quantities.

Among the important objectives of our invention is that of measuring cross-sectional areas of objects, both inanimate and animate. And in this aspect of our invention it is an important object to avoid the complications and the errors, arising from various conditions of temperature and other conditions, that frequently occur with the use of certain conventional measuring instruments. In the accomplishment of these objectives we employ, in accordance with our invention, electromagnetic induction means embodying a conducting pick-up coil encircling the member or region being measured, the coil and part which is being measured being placed within a uniform alternating magnetic field, the principle being that the voltage induced in the coil by the field is directly proportional to the area embraced by the coil. This method has been found to be accurate, capable of operation under conditions which would render other conventional measuring apparatus impracticable or inaccurate, and adapted for a great variety of uses, as will more clearly hereinafter be set forth.

It is also within the contemplation of our invention to provide a device capable of measuring changes in cross-sectional areas, such as may occur in portions of a body resulting from muscular contractions, etc., or in connection with fluid flow in elastic tubes or in members of an inimate body.

In connection with the last-mentioned aspect of our invention, it is a further object to provide a device capable of measuring the pressure, velocity of pulsatile flow, the rate of flow, etc., and the behavior of tubes under conditions of stress, temperatures, etc., in the field of fluid dynamics.

Another object of our invention is to enable the ready and convenient measurement of volumes of solid or tubular bodies, an objective which is accomplished by our invention by the integration of cross-sectional areas with respect to the length of the section being measured.

And in further connection with the adaptability of our invention to the measurement of fluid flow, it is a further objective to accomplish such measurement by storing the effluent and measuring the rate of increase of its volume, which equals the rate of flow, an application thereof being in the field of plethysmography, the measurement of the flow of blood in human or animal limbs or other parts of the anatomy by means of volume change indications or recordings.

It is also within the contemplation of our invention to effectuate the measurement of the position of an object in those instances where such change of position causes a change in the embraced area of the pick-up coil above mentioned, an application of this aspect of our invention being in the field of general strain gauging.

Still a further object of our invention is the provision of a device capable of the general measurement of irregular areas, such as those defined by boundary lines in maps, charts, etc. In this aspect of our invention the conductor embracing the area, instead of being the pick-up coil above mentioned, is a line of conductive ink or pencil, or fine wire, the voltage induced in this line or wire (placed in a uniform alternating magnetic field) being directly proportional to the embraced area. This aspect of our invention has application in the field of cartography and in the measurement of elastic surfaces, particularly although not exclusively in the study of stresses when the dimensions of the object being measured are markedly changed when the object is strained.

Still a further object of our invention is to provide a pick-up coil particularly adapted for expandable embracing engagement with the surface of a member to be measured, and so constructed and arranged whereby the voltage operatively induced therein will be affected only by the change in the embraced area, and will remain substantially unaffected by other changes in dimensions, proportions and shape of the coil during its expansion.

Other objects, features and advantages will appear from the drawings and the description hereinafter given.

Referring to the drawings,

Figure 1 is a schematic drawing showing the field and pick-up coils and their electrical connections of one form of our invention.

Figure 2 is a perspective view of a member being measured, with a pick-up coil operatively placed thereover, the drawing further schematically illustrating the field coils and electrical connections, as well as the magnetic field.

Figure 3:
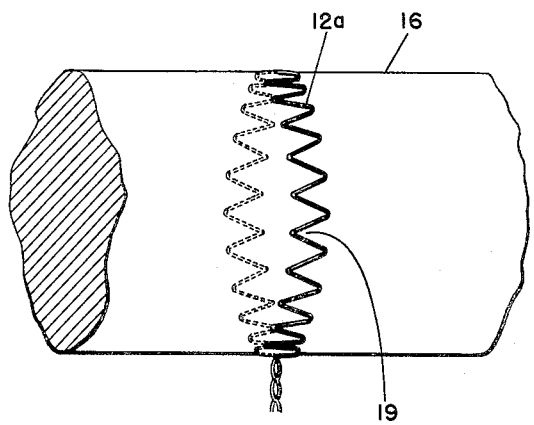
Figure 3 is a fragmentary perspective of a member being measured with a pick-up coil placed thereover, the coil being substantially like that illustrated in Fig. 2, and being shown in its condition before the expansion of the member.

As aforesaid, the essence of our invention resides in the use of electro-magnetic induction to measure cross-sectional areas and area changes. In the preferred form of practicing our invention, as will more in detail hereinafter be described, the alternating magnetic field is produced by an oscillator-amplifier field coil set-up; and in this field an expansible pick-up coil is placed, encircling the member being measured, the member being positioned parallel to the magnetic field. The pick-up coil (hereinafter called the "pick-up") is so constructed that an increase and decrease in its cross-sectional area can be produced without the employment of appreciable force. The arrangement is such that the voltage induced in the pick-up is amplified by suitable electronic equipment, and observed through an oscilloscope or other indicating or recording means.

In Figure 1 of the drawings the field coils 10 and 11 are illustrated as being of substantially equal diameters and as flanking the pick-up 12, the latter being shown as smaller than the field coils, disposed midway therebetween, and adapted for embracing and contacting engagement with a member to be measured. The said field coils, which may be Helmholtz coils, solenoids or other magnetic field producing devices, are operatively energized by any means known in the art, such as by a field supply 13, or by the combination of an oscillator 14 and power amplifier 15 electrically connected to each of the coils as illustrated. The energization of the field coils produces an alternating magnetic field, the central portion of which extends substantially parallel to the axes of the field coils and pick-up, and is intercepted by the pick-up. Since the member being measured, such as the cylindrical member 16 of Fig. 2, extends axially through the pick-up, said member is parallel to the magnetic field, and any increase in the diameter of the member will be transverse with respect to the direction of said field. And as the pick-up 12 is flexible and expandable, according to a construction to be hereinafter described, any increase in the member being measured will cause a corresponding increase in the diameter of the pick-up coil, thereby enclosing more of the lines of force of the field. The arrangement is obviously such that a voltage will be induced in the pick-up 12 which can be amplified and observed by such electronic equipment as the voltage amplifier 17 and the recorder 18 electrically connected to the pick-up, as shown in Figs. 1 and 2.

It is apparent that with the set-up above described the voltage induced in the pick-up 12 will be proportional to the area embraced thereby. And obviously, changes in the cross-sectional area of the member being measured will cause changes in the voltage induced within the pick-up, since it is adapted to expand with the expansion of the member. Hence, should it be desired to measure the volume of a member such as 16, whether it be an animate or inanimate object, cross-sectional areas may be integrated with respect to the length of the member. Thus, by the use of our instrument or system above described, volume changes may be obtained by integrating changes in cross-sectional areas. The readings measure changes in the voltage output, and these are readily translatable into volume changes. By employing suitable electronic circuits, these voltages may be differentiated; and in this way, readings may be obtained which are proportional to the area and volume changes per second. When applied to a limb, the volume changes per second produced by the usual procedures of plethysmography are obtained by integrating the changes in cross-sectional area per second, the results being related and expressed in volume changes per second per unit of initial volume of tissue.

Figure 4:
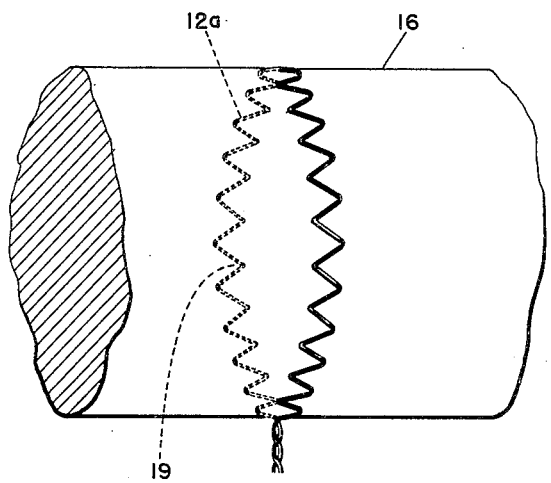
Figure 4 is a view like Fig. 3, but showing the parts in their expanded condition.

The specific pick-up coil 12a illustrated in Figs. 2 to 4 consists of a single turn of fine-gauge conducting wire, although it is within our contemplation to employ, where necessary, a pick-up arrangement having a plurality of adjacent coils or a coil with a plurality of turns. For the purpose of this specification, however, the term "pick-up coil" will be broadly used to cover any of these constructions. The wire of the coil is of soft temper, the wire being of wavy configuration substantially throughout its entire extent, the bends which form the wavy configuration extending generally in the direction of the axis of the pick-up coil, substantially parallel to the surface of member 16 embraced by the coil 12a, and forming a plurality of angles 19 between each wave formation. In other words, the wavy or zig-zag formations extend in a direction substantially at right angles to the plane of the pick-up coil. Hence, if the pick-up coil 12a is in embracing engagement with the peripheral surface of member 16, it will expand therewith in the event said member 16 is caused to expand. The waves or undulations in the pick-up coil 12a obviously permit such expansion thereof; and during this expansion, the only material change that takes place in the coil is in the angles 19. This change or deformation of the wavy portions of coil 12a does not, as a practical matter, affect the voltage induced therein, since this represents changes substantially in a direction parallel to the magnetic field, represented by the lines 20. This is true even where the member being measured is not of uniform cross-section throughout its length, the compensating or opposing changes in the wavy portions of the pick-up coil obviously producing correct average values.

Thus, the use of a pick-up coil of the above-described construction is particularly adapted for use with our apparatus, since it expands together with the expansion of the embraced member being measured and does not, during the process of expansion, introduce extraneous factors which may have an effect upon the induced voltage. Furthermore, the wavy configuration produces a yieldable structure which eliminates the danger of stretching the wire, which would cause a change in resistance and would accordingly affect the induced current. The thinness and softness of the wire permit the coil to expand readily with the increase in cross-section of the embraced member, since very little force is necessary to overcome the resistance the wire affords to such an expansion. It should be observed that if the wire were not readily responsive to the expanding action of the member being measured and would not easily expand therewith, it would exert a binding effort around the embraced area and thereby hinder its expansion, an action which would be particularly objectionable in the case of the measurement of soft tubes or living tissue.

Figure 5:
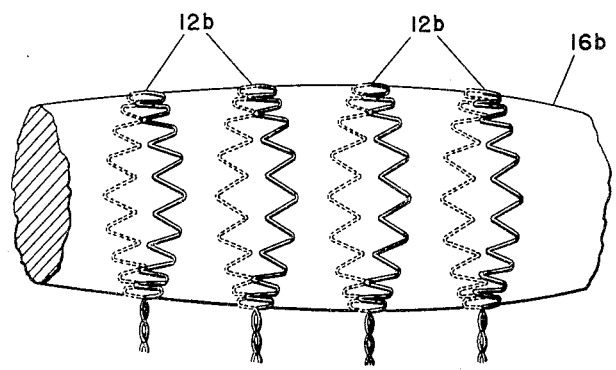
Figure 5 shows a multiple pick-up arrangement over a member of non-uniform cross-section.

The said pick-up coil 12a may be applied to the member being measured by one of several different methods. Under certain conditions it would be satisfactory to apply the coil 12a directly upon the member 16 without any holding means other than the resiliency of the wavy wire itself, as is indicated in Figs. 3 and 4 which show the pick-up coil and embraced member in their normal and expanded condition, respectively. However, if need be, the coil may be cemented to the surface with a suitable elastic medium, or may be yieldably held against the surface by an inflated cuff, or by an elastic cuff such as is shown in the concurrently filed application for a plethysmograph, Serial No. 66,524.

Where a single cross-sectional area is to be measured, a single pick-up coil 12a is employed, as shown in Figs. 3 and 4. However, should it be desired to obtain volume measurements, a plurality of pick-up coils 12b are arranged in spaced relation on the member to be measured. Thus, in Fig. 5, a non-uniform member 16b is shown operatively embraced by four separate pick-up coils 12b, the separate area results for each pick-up being integrated along the length of the member to obtain volume results.

Figure 6:
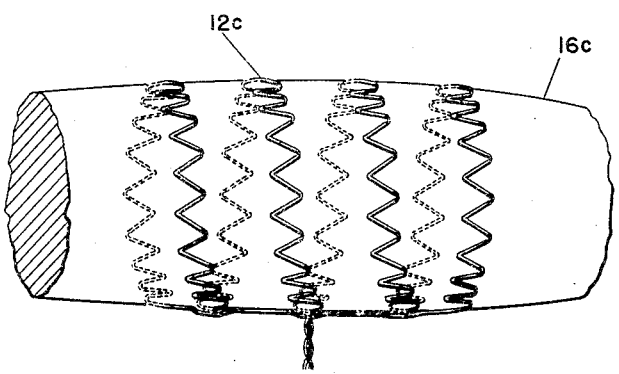
Figure 6 illustrates a helical from of pick-up member operatively disposed upon a member being measured.

Instead of separate pick-ups 12b, a helical pick-up 12c (Fig. 6) is operatively placed over the member 16c, the voltage produced by this arrangement being proportional to the volume of the member along the length being measured.

Figure 7:
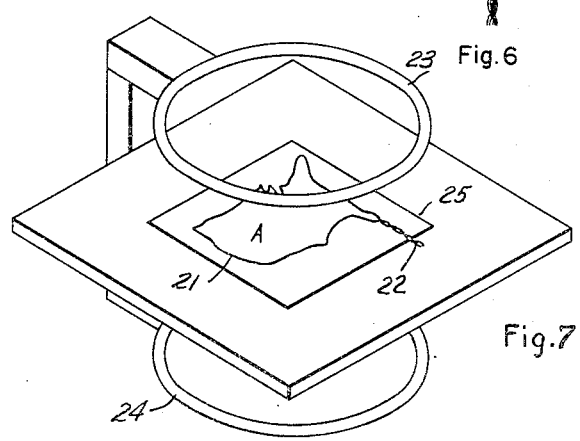
Figure 7 is a perspective, semi-diagrammatic view of a modified form of our invention in which a map with an outline of conducting ink is operatively placed between the field coils, shown in perspective.
Figure 8:
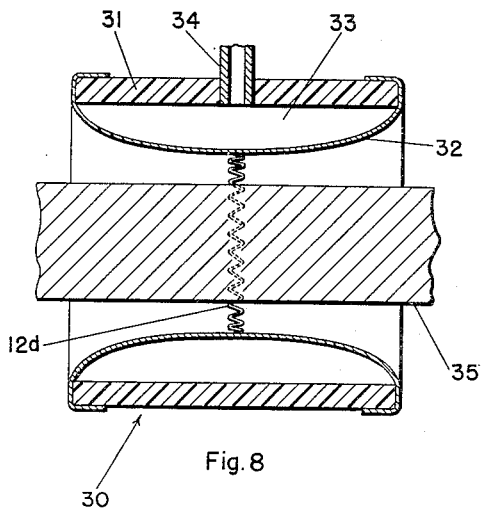
Figure 8 is a vertical central section of an inflatable pick-up device for use in our invention, the device being shown in operative condition with respect to a member being measured.
Figure 9:
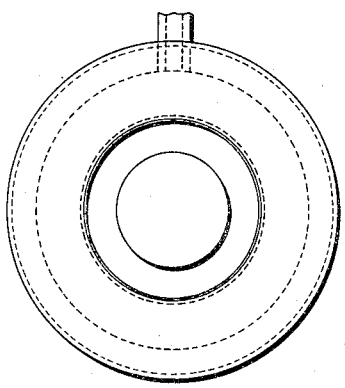
Figure 9 is an end view of Fig. 8.
Figure 10:
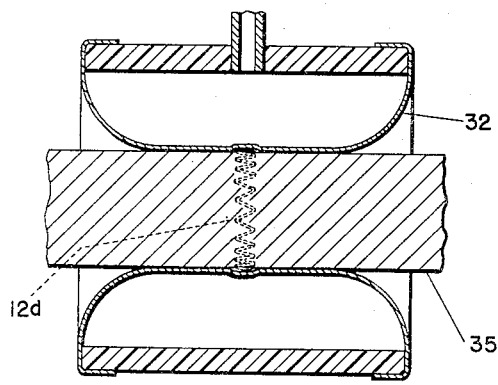
Figure 10 is a sectional view like that of Fig. 8, but showing the inflated portion in its expanded or operable position, in contact with the outer surface of the member being measured.
Figure 11:
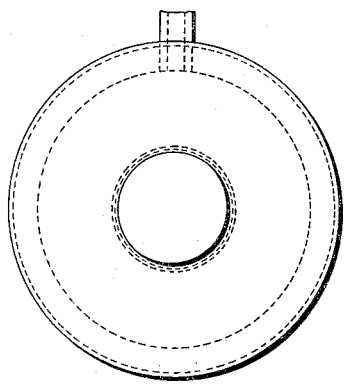
Figure 11 is an end view of Fig. 10.

Figure 7 shows a further adaptation of our invention wherein a flat area is to be measured. Instead of employing a coil pick-up member, the area to be measured, such as the representation of the area A of the map of the United States, is outlined by a line of conducting ink or pencil, or by the fine wire 21, the leads 22 of which are electrically connected to a voltage amplifier and recording or indicating system substantially in the manner above described. The coils 23 and 24 are substantially like the coils 10 and 11 above mentioned, these being similarly connected to an oscillator-power amplifier set-up to create an alternating magnetic field. Outline 21 is made on a board or sheet 25 of non-conducting material.

In operatively employing the arrangement of Fig. 7, it is apparent that a voltage will be induced within the conductor 21, such voltage being proportional to the area A embraced by conductor 21. The indicating or recording apparatus electrically connected to leads 22 can be calibrated to indicate or record areas, substantially in the manner above mentioned.

It is thus evident that our invention has applicability in the field of cartography, where the area to be measured is on an inelastic surface. And where the area is outlined on an elastic surface, any increase in the area, such as that produced by a stress, can also be measured by the method above described, whereby our invention could also be applied in the study of stresses induced in yieldable or elastic materials.

In employing our system for plethysmographic purposes, as above indicated, the conventional venous occlusion method is used, permitting measurements of the total blood flow. This can be accomplished in the manner described in the concurrently filed application, Serial No. 66,524. The same method renders our invention adaptable for the general measurement of fluid flow where elastic non-conducting tubes can be employed as a conduit for a fluid, by storing the effluent and measuring, by the method above described, the rate of increase of volume, which equals the rate of flow.

Figures 8 to 11 show a pick-up device adapted for convenient and effective use with our system—particularly desirable because it insures a yieldable and complete contact with the outer surface of the member being measured. This form of our invention employs an air pressure cuff 30 comprising, in its preferred form, a rigid tubular member 31 and attached thereto, along the peripheral position thereof, the inner elastic wall 32 forming an annular air chamber 33 between elastic wall 32 and member 31. The air inlet tube 34 is attached to member 31 and communicates with the air chamber 33. The medial portion of the annular wall 32 has suitably attached thereto the pick-up coil 12d adapted for contacting engagement with a member to be measured, such as 35.

When operatively employing said device, the chamber 33 receives air under pressure through tube 34, causing the wall 32 to expand inwardly until the pick-up coil 12d is brought into engagement with the outer surface of member 35. Thereafter, as the member 35 is caused to expand, the pick-up coil 12d will also expand against the resilient air cushion surrounding it in the form of the inflated wall portion 32.

The last-described form of pick-up is adaptable for use in measuring cross-sectional areas of both animate and inanimate objects.

In the above description, the invention has been disclosed merely by way of example and in preferred manner; but obviously many variations and modifications may be made therein which will still be comprised within its spirit. It is to be understood, therefore, that the invention is not limited to any specific form or manner of practicing same, except insofar as such limitations are specified in the appended claims.

We claim:

1. In a device of the class described for performing a cross-sectional area measurement on a member, a pick-up conductor, magnetic field means comprising at least one field coil, an oscillating current source electrically connected to said field means, said field means being positioned in the region of said conductor and proportioned for producing a substantially uniform alternating magnetic field in intercepting relation to said conductor, whereby a voltage will be induced in said conductor, and voltage-responsive means electrically connected to the pick-up conductor, the said conductor being adjustable for enabling it to operatively conform substantially to the configuration of said member being measured.

2. In a device of the class described, the combination according to claim 1, the said field means comprising two field coils that are substantially circular and parallel and having coincident axes, the pick-up conductor being looped into a coil having an axis substantially parallel to that of the field coils, said looped coil being proportioned for embracing engagement with the member being measured.

3. In a device of the class described, the combination according to claim 1, the said field means comprising two field coils that are substantially circular and parallel and having coincident axes, the pick-up conductor being disposed within a plane transverse to the said field coil axes.

4. In a device of the class described, the combination according to claim 8, the field coils and pick-up conductor being circular and substantially parallel, and having coincident axes.

5. In a device of the class described, the combination according to claim 8, the field coils and pick-up conductor being circular and substantially parallel, and having coincident axes, the field coils being of substantially equal diameters and larger than the pick-up conductor.

6. In a device of the class described, the combination according to claim 8, the field coils and pick-up conductor being circular and substantially parallel, and having coincident axes, the field coils being of substantially equal diameters and larger than the pick-up diameter, the pick-up conductor being substantially midway between the field coils.

7. In a device of the class described for performing a cross-sectional area measurement on a member, two field coils, an oscillating current source electrically connected to the coils for creating therebetween an alternating magnetic field, a pick-up conductor disposed between said field coils for positioning within said magnetic field, whereby a voltage is induced within the said conductor, and voltage-responsive means electrically connected to the pick-up conductor, the said conductor being proportioned for contacting engagement with the said member being measured, the pick-up conductor being adjustable for enabling it substantially to conform to the configuration of said member, the conductor being expandable, whereby the conductor will expand with an operable expansion of the member being measured.

8. In a device of the class described for performing a cross-sectional area measurement on a member, two field coils, an oscillating current source electrically connected to the coils for creating therebetween an alternating magnetic field, a pick-up conductor disposed between said field coils for positioning within said magnetic field, whereby a voltage is induced within the said conductor, and voltage-responsive means electrically connected to the pick-up conductor, the said conductor being proportioned for contacting engagement with the said member being measured, the pick-up conductor containing undulating portions, whereby it is expandable.

9. In a device of the class described for performing a cross-sectional area measurement on a member, two field coils, an oscillating current source electrically connected to the coils for creating therebetween an alternating magnetic field, a pick-up conductor disposed between said field coils for positioning within said magnetic field, whereby a voltage is induced within the said conductor, and voltage-responsive means electrically connected to the pick-up conductor, the said conductor being proportioned for contacting engagement with the said member being measured, the pick-up conductor being substantially circular and containing undulating portions, whereby it is expandable, the undulations extending generally transversely with respect to the plane of the circular conductor.

10. In a device of the class described for performing a measurement on an elongated member, two field coils with central openings and energized by an oscillating current source for producing in a region therebetween a uniform alternating magnetic field, a pick-up coil having a central opening and disposed between said field coils for positioning within said region of the magnetic field whereby a voltage is induced therein, and voltage-responsive means electrically connected to the pick-up coil, the said coils being substantially parallel to each other and proportioned and arranged to accommodate through their central openings the elongated member being measured, whereby the member extends substantially parallel to the direction of the magnetic field, the pick-up coil being adjustable for enabling it to operatively conform substantially to the configuration of said member.

11. In a device of the class described for performing a measurement on an elongated member, magnetic field means comprising at least one field coil with a central opening and energized by an oscillating current source for producing an alternating magnetic field having a uniform region, a plurality of spaced pick-up coils having central openings and being disposed within said magnetic field whereby a voltage is induced therein, and voltage-responsive means electrically connected to the said pick-up coils, all said coils being substantially parallel to each other and proportioned and arranged to accommodate through their central openings the elongated member being measured, whereby the member extends substantially parallel to the direction of the magnetic field, the pick-up coils being adjustable for enabling them to operatively conform substantially to the configuration of said member.

12. In a device of the class described for performing a measurement on an elongated member, magnetic field means comprising at least one field coil with a central opening and energized by an oscillating current source for producing an alternating magnetic field having a uniform region, a helical pick-up coil having a central opening and disposed within said magnetic field whereby a voltage is induced therein, and voltage-responsive means electrically connected to the pick-up coil, the said central openings of the coils being in longitudinal alignment and proportioned to accommodate the elongated member being measured, whereby the member extends substantially parallel to the direction of the magnetic field, the pick-up coil being adjustable for enabling it to operatively conform substantially to the configuration of said member.

13. In a device of the class described for performing a measurement of an area, a sheet of non-conducting material containing said area, a conductor embracing said area, and magnetic field means comprising at least one field coil and energized by an oscillating current source for producing an alternating magnetic field having a uniform region, said sheet and conductor being disposed within said region, whereby a voltage is induced in said conductor.

14. In a device of the class described, the combination according to claim 13, the conductor comprising a line of conducting material drawn on said sheet about the said area.

15. A device of the class described for performing a measurement on a member, comprising a pick-up conductor disposed in an alternating magnetic field, and voltage-responsive means electrically connected to the pick-up conductor, the said conductor being proportioned for contacting engagement with the said member being measured, the conductor having undulating portions, whereby it is expandable.

16. A device of the class described for performing a measurement on a member, comprising a pick-up conductor disposed in a uniform alternating magnetic field, and voltage-responsive means electrically connected to the pick-up conductor, the said conductor being operatively connected with the said member being measured and movable transversely relative to the field, whereby such movement will operatively occur during the taking of a measurement, said conductor being adjustable for enabling it to operatively conform substantially to the configuration of the said member being measured.

17. A device according to claim 15, the pick-up conductor being disposed in a uniform alternating magnetic field.

18. In a method of measuring the cross-sectional area change of a member, the steps of providing an expandable pick-up conducting coil, embracing the member to be measured with said coil whereby the coil and member are in contacting engagement, producing a uniform alternating magnetic field across said coil and in a direction transverse to the plane of the area being measured, whereby a voltage will be induced within the coil, measuring said voltage, causing the area being measured to change, whereby the coil will correspondingly change its proportions and will move transversely across the said magnetic field, and measuring the voltage induced in the coil.

HAROLD D. GOLDBERG.
MILTON I. GOLDBERG.

References Cited in the file of this patent

UNITED STATES PATENTS

| Number | Name | Date |
|---|---|---|
| 1,610,971 | Ruben | Dec. 14, 1926 |
| 2,124,579 | Knerr et al. | July 26, 1938 |
| 2,411,403 | Wentz | Nov. 19, 1946 |